United States Patent Office 3,257,357
Patented June 21, 1966

3,257,357
COPOLYMERS OF POLYPHENYLENE ETHERS
Gelu Stoeff Stamatoff, Newark, Del., assignor to E. I. du Pont de Nemours and Company, Wilmington, Del., a corporation of Delaware
No Drawing. Filed Apr. 1, 1963, Ser. No. 269,715
23 Claims. (Cl. 260—47)

The present invention relates to novel polyphenylene ethers, their method of preparation, and, more particularly, to high molecular weight polyphenylene ethers suitable as raw materials in the fabrication of fire-resistant films, fibers, and other molded and extruded shapes. This application is a continuation-in-part of an earlier application, Serial No. 31,544, filed May 25, 1960, now abandoned.

Although it has been known heretofore that 2,6-disubstituted phenols and 2,6-disubstituted-4-halophenols may be subjected to oxidative coupling, no method had been found to prepare high molecular weight, linear polyphenylene ethers through oxidation of 2,6-disubstituted-4-halophenolate ions.

It is, therefore, an object of the present invention to provide novel, high molecular weight 2,6-disubstituted polyphenylene ethers. It is another object to provide a method for the polymerization of 2,6-disubstituted-4-halophenols to form 2,6-disubstituted polyphenylene ethers. It is a particular object to provide a method for the copolymerization of 2,6-dialkylsubstituted-4-halophenols with 2,4,6-trihalophenols to form fire-resistant polyphenylene ether copolymers. Other objects will be apparent hereinafter.

The objects of the present invention are accomplished by a process which comprises admixing free oxygen with an initiator such as an inorganic peroxide, an organic acid peroxide, a persulfate, a hypochlorite, or a hypobromite with an aqueous solution of a phenolate ion having the generic formula

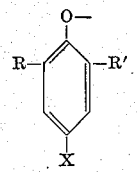

where R and R' are bromine, chlorine, iodine and alkyl groups having from one to four carbon atoms inclusive, and X is a halogen selected from the class consisting of bromine and iodine, in the presence of a liquid organic solvent immiscible with the aqueous phase and capable of dissolving the polymer and recovering a solution of a polyphenylene ether in said organic solvent. If X is chlorine, it is more difficult to achieve the yields and molecular weights obtained when the phenolate ion is as described above. However, by adjusting conditions so that the concentration of the phenolate ion (where X is chlorine) is higher and the aqueous solution more alkaline, essentially quantitative yields of high molecular weight polyphenylene ether have been obtained. The 2,6-disubstituted polyphenylene ethers and the 2,6-disubstituted-4-halophenols may be symmetrically- or unsymmetrically-disubstituted. The terms "symmetrically-disubstituted" and "unsymmetrically-disubstituted" are used herein to denote the similarity or non-similarity, respectively, of the groups attached to the 2- and 6-positions of the polyphenylene ethers or the phenols.

While not wishing to be bound by any theory of the mechanism of this polymerization, it is believed that this polymerization proceeds by an entirely new type of free-radical mechanism which I term "free-radical condensation." The phenolate anion is converted to a colored free-radical which then attacks the 4-position of another phenolate ion splitting out a bromine radical. The main growth is slow compared to normal free-radical polymerizations and chain length continues to grow over a long period of time.

Agents suitable to initiate the polymerization of phenolate ions to high molecular weight polyphenylene ethers are the combination of free oxygen with an initiator of the class consisting of inorganic peroxyacid salts, organic acid peroxides, hypochlorites, and hypobromites, e.g., ammonium persulfate, tert.-butyl hypochlorite and benzoyl peroxide. At higher temperatures, e.g., about 70° C., inorganic periodate salts will also function. Hydrogen peroxide and organic hydroperoxides are not as effective. The oxygen necessary for the polymerization is generally supplied to the reaction system by carrying out the polymerization in an oxygen-containing environment in which excess quantities of oxygen are present. The combination of oxygen and initiator, when contacted with a phenolate ion, produces the free radical even at temperatures as low as 0° C. and even lower in some cases. It was also found that the addition of a water-soluble polyvalent metal salt, such as copper sulfate, aids in the formation of high molecular weight polyphenylene ether homopolymers. It was found to be unnecessary in the copolymerization reactions due to the discovery that the trihalophenol comonomers act as cocatalysts. Of the trihalophenols utilized as comonomers, the 2,4,6-triiodophenol was found to be the most effective cocatalyst. The initiator used in the process of the present invention is employed in the polymerization in quantities normal for the initiation of a polymerization to high molecular weight, i.e., concentrations varying in general from 0.001 to 10% by weight of the monomer.

It is essential that the polymerization of the phenolate ions be carried out in a two phase system; an aqueous medium containing the dissolved monomers and an organic liquid phase, immiscible with the aqueous phase but capable of dissolving the polyphenylene ether. If the polymerization is carried out in the absence of such an organic phase, only low molecular weight polymers are obtained. Suitable solvents are, in general, liquid aromatic hydrocarbons, halogenated hydrocarbons and similar known solvents for polymers. Preferred solvents are aromatic hydrocarbons, such as benzene, xylene and toluene, halogenated aromatic hydrocarbons, trichloroethylene, and tetrachloroethylene. The solvents are employed in dispersed form in the aqueous medium. Large droplets, such as are formed by mild mechanical agitation of an aqueous and immiscible organic phase, are sufficient. If desired, a surface-active agent, such as "Duponol" C (sodium lauryl sulfate, U.S.P.) or "Duponol" ME (sodium lauryl sulfate, technical grade), may be employed to achieve a better dispersion of the organic phase in the aqueous phase. In some cases, a dispersing agent, such as the sodium salt of polymethacrylic acid, the sodium salt of styrene/maleic anhydride copolymer or polyvinyl alcohol may also be employed. The quantity of the solvent is not critical, but should be sufficient to maintain the polymer in solution and, thus, depends in part on the solvent power of the compound employed. In general, the weight ratio of solvent to monomer should be at least one and preferably much higher, i.e., such that a solution of 5 to 25 weight percent of polymer is obtained on polymerization.

As described above, the monomers employed in the present invention comprise the anions of 2,6-disubstituted-4-halophenols. Examples of phenols which, in ionized form, can be employed in the process of the present invention are 2,6-dimethyl-4-bromophenol,
2,6-dichloro-4-bromophenol,
2,4,6-tribromophenol,
2,6-dimethyl-4-iodophenol,
2,6-diethyl-4-bromophenol,
2,6-diisopropyl-4-bromophenol,
2,6-diethyl-4-iodophenol,
2,6-di(tert.-butyl)4-bromophenol,
2-methyl-4-bromo-6-isopropylphenol,
2-methyl-4-bromo-6-ethylphenol,
2-methyl-4-bromo-n-butylphenol, and
2-methyl-4-bromo-6-chlorophenol.

The preferred monomers are ionized 2,6-dimethyl-4-bromophenol and 2,6-dichloro-4-bromophenol. More than one phenol may be employed if copolymers are desired. For the preparation of fire-resistant, particularly non-burning copolymers, the preferred comonomers to be polymerized with the ionized 2,6-dialkylsubstituted-4-bromophenols are ionized 2,4,6-tribromophenol and 2,4,6-trichlorophenol.

Employing 2,6-dimethyl-4-bromophenol, a high molecular weight homopolymer having superior physical properties, is obtained by the process of the present invention. The polyphenylene ether homopolymers prepared from 2,6-dimethyl-4-bromophenol by the two phase polymerization of the present invention generally have inherent viscosities above 1.0 as determined by a 0.5% solution of the polymer in chlorobenzene at 25° C. Polyphenylene ether copolymers prepared form 2,6-dialkylsubstituted-4-halophenols and trihalophenols by the polymerization of the present invention have inherent viscosities of at least 0.3 and in many cases over 1.0 as determined by a 0.5% solution in chlorobenzene at 25° C.

The polyphenylene ethers of the present invention are obtained by a two phase polymerization of an aqueous solution of the monomers. The monomers, i.e., the phenolate ions, are formed by dissolving one or more of the phenols in water and making the aqueous phase alkaline through, preferably, the addition of an alkali metal hydroxide. In general, the quantity of the alkali metal hydroxide is equivalent to the quantity of phenol or as in the case of the copolymerizations in slight excess, preferably from 5 to 8 percent. Substantially greater than equivalent quantities of the alkali tend to lower the molecular weight of the product. The polymerizations are generally carried out at room temperature, although higher or lower temperatures can be employed in the range of −20 to 80° C. For the copolymerizations, the preferred temperature range is 50–60° C. although the polymerization will proceed at higher or lower temperatures. The catalyst may be added stepwise or in its entirety to the polymerization mixtures. The polymer is formed at the aqueous and organic solvent interphase and dissolves in the organic phase. The time required to attain high molecular weight copolymers under the conditions hereinabove specified may vary from several days at temperatures below 0° C. to less than an hour at 80° C. The end of the polymerization is indicated by the clearing of the aqueous phase, which becomes light yellow and opaque on initiation of the polymerization, and no further increase in viscosity of the organic phase is observed. The polymer can be isolated from the two phase polymerization medium in various ways. A convenient procedure is to add a large excess of a water-soluble organic solvent such as acetone or methanol. This causes the polymer to precipitate and it can then be collected by filtration or centrifugation. The homopolymerization of the phenolate ion is virtually complete and yields of purified polymer of close to 100% are usually obtained. Yields of copolymer as high as 80–85% can be obtained especially when operating at comonomer ratios of >85/15 (2,6-dialkylsubstituted-4-halophenol/2,4,6-trihalophenol).

Monomer mixtures of 25 to 99.9 mole percent 2,6-dialkylsubstituted-4-halophenol and 0.1 to 75 mole percent 2,4,6-trihalophenol can be employed in the copolymerization reactions. The preferred ranges in the comonomer mixture are 70 to 99.9 mole percent 2,6-dialkylsubstituted-4-halophenol and 0.1 to 30 mole percent 2,4,6-trihalophenol. Copolymers containing from 0.1 up to ~50 mole percent 2,6-dihalophenylene oxide units can be obtained from the above mixtures using the process of the present invention.

The process is further illustrated by the following examples.

*Example I*

Into a 180 ml. polyethylene bottle was charged 100 ml. of water, 0.0354 mole of 2,6-dimethyl-4-bromophenol, 0.03825 mole of potassium hydroxide, 0.01 g. of cupric sulfate in 1 ml. of water, 0.05 g. of "Duponol" ME, sodium lauryl sulfate, in 1 ml. of water and 20 ml. of benzene. The air in the bottle was displaced with oxygen and pressured to 15 p.s.i.g. with the oxygen. The reaction mixture was agitated for 15 minutes. Three portions of 0.0002 mole of ammonium persulfate dissolved in 2 ml. of water were then added in 15 minute intervals. The reaction mixture was agitated for 14.5 hours at room temperature. The benzene layer of the reaction mixture was separated, washed and the poly (2,6-dimethylphenylene oxide) was precipitated out of the benzene by addition of acetone. On washing and drying, 4.2 g. of poly(2,6-dimethylphenylene oxide) was obtained. The polyphenylene ether was found to have an inherent viscosity, as measured by a 0.5% solution of the polymer in chlorobenzene, at 25° C. of 1.25.

*Example II*

Employ the procedure of Example I with 0.1 g. of benzoyl peroxide in place of the ammonium persulfate as the initiator. The product obtained as above had an inherent viscosity of 1.25.

*Example III*

Into a 180 ml. polyethylene bottle was charged 0.04 mole of 2,6-dimethyl-4-bromophenol and 110 ml. of water containing 0.04 mole of lithium hydroxide. The reaction mixture was agitated for 75 min. until almost all of the phenol had dissolved. Undissolved phenol was removed. To the reaction mixture was added 0.01 g. of cupric sulfate in 1 ml. of water, 0.05 g. of "Duponol" ME in 1 ml. of water and 20 ml. of benzene. The air in the reaction bottle was replaced with oxygen and 0.0002 mole of ammonium persulfate in 2 ml. of water was added. Oxygen was recharged as needed. The reaction was continued for 4 hours with mild agitation. On work-up of the reaction mixture, 4 g. of poly(2,6-dimethylphenylene oxide) having an inherent viscosity of 0.89 (measured as in Example I) was obtained. The polyphenylene ether could be molded into tough, flexible films which on X-ray examination were determined to be amorphous.

*Example IV*

Into a 180 ml. polyethylene bottle was charged 0.040 mole of tribromophenol, 0.040 mole of lithium hydroxide in 100 ml. of water, 20 ml. of chlorobenzene and 0.2 g. of "Duponol" ME. The reaction mixture was agitated for 16 hours to form an aqueous solution of the phenol. The polymerization was initiated by the addition of 0.002 mole of ammonium persulfate which was repeated after two hours. The mixture was agitated for a total of 47 hours. On standard work-up there was obtained 9.5 g. of poly(2,6-dibromophenylene oxide) having an inherent viscosity of 0.64 as measured by a 0.5% solution of the polymer in tetrahydrofuran.

Example V

Employing the procedure of Example IV with 2,6-dichloro-4-bromophenol instead of the tribromophenol, a poly(2,6-dichlorophenylene oxide) having an inherent viscosity of 0.4 was obtained.

Example VI

Into a 180 ml. polyethylene bottle was charged 0.040 mole of 2-methyl-4,6-dibromophenol and 100 ml. of water containing 0.040 mole of lithium hydroxide. The mixture was agitated for 3 hours and filtered. To the solution was then added 20 ml. of benzene, 0.25 g. of "Duponol" ME and 0.0002 mole of $(NH_4)_2S_2O_8$ at 25° C. The polymerization was allowed to continue for 64 hours. The reaction mixture was worked up in the usual manner and 4.5 g. of poly(2-methyl-6-bromophenylene oxide) was isolated.

Example VII

Into a 180 ml. polyethylene bottle was charged 0.040 mole of 2,6-diisopropyl-4-bromophenol and 0.040 mole of lithium hydroxide dissolved in 100 ml. of water. The mixture was agitated in air for one hour to dissolve the phenol and 20 ml. of benzene was then added. The polymerization was initiated by the addition of 0.05 g. of "Duponol" ME and 0.0002 mole of $(NH_4)_2S_2O^8$. The reaction was continued for 16 hours with mild agitation. On separation and purification there was obtained 3.4 g. of poly(2,6-diisopropylphenylene oxide).

Example VIII

Into a 180 ml. polyethylene bottle was charged 0.030 mole of 2,6-di(-tert.-butyl)4-bromophenol, 0.040 mole of lithium hydroxide in 100 ml. of water, 0.040 g. of cupric sulfate and 20 ml. of benzene. The bottle was pressured with oxygen to 15 p.s.i.g. and agitated for 7 hours. Thereafter, 3 portions of 0.0002 mole of ammonium persulfate were added in 40 minute intervals. The polymerization was continued for 41 hours. Poly(2,6-di-tert.-butylphenylene oxide) weighing 1.8 g. was isolated from the resulting reaction mixture.

Example IX

To a 180 ml. polyethylene bottle was added 100 ml. of water, 0.01 g. copper sulfate dissolved in 1 ml. of water, 0.05 g. sodium lauryl sulfate dissolved in 1 ml. of water, 0.044 mole lithium hydroxide, 0.0415 mole 2-methyl-4-bromo-6-isopropylphenol and 25 ml. of benzene. After the mixture was shaken for 15 minutes using a mechanical shaker to ensure dispersion, 0.0002 mole of ammonium persulfate dissolved in 1 ml. of water was added. Shaking was continued for two hours after which a like quantity of ammonium persulfate was added and shaking continued for 48 hours. Air was supplied to the system throughout the entire time that oxygen was used up in the reaction. The polymer was precipitated in acetone, filtered, washed with water and dried to give 5.5 g. of product having an inherent viscosity of 0.6 and a stick temperature of 220–230° C. The polymer could be compression molded at 200–250° C. into stiff, tough, transparent films which appeared to be completely amorphous according to X-ray analyses.

Example X

Example IX was repeated using in place of the 2-methyl-4-bromo-6-isopropylphenol a like molar quantity of 2-methyl-4-bromo-6-ethylphenol. This product, likewise, could be compression molded at 200–250° C. into stiff, tough, transparent films.

Example XI

Example IX was repeated using 0.0415 mole 2-methyl-4-bromo-6-n-butylphenol in place of the isopropyl derivative. The product obtained as above had an inherent viscosity of 0.6.

Example XII

Example IX was repeated using 0.0415 mole 2-methyl-4-bromo-6-chlorophenol in place of the isopropyl derivative. The product obtained as above had an inherent viscosity of 0.5.

Example XIII

A mixture of 20.6 g. (0.102 mole) of 2,6-dimethyl-4-bromophenol, 3.75 g. (0.011 mole) of 2,4,6-tribromophenol, 250 ml. of water, 0.123 mole of potassium hydroxide added as an approximately 0.5 N aqueous solution, 60 ml. of chlorobenzene, 25 ml. of a 1.5% aqueous solution of the sodium salt of a 1/1 styrene/maleic anhydride copolymer, and 0.1 g. of "Duponol" ME was added to high shear mechanical mixer, such as an "Osterizer" or a "Waring" Blendor, and thoroughly mixed for 25 minutes. Thereafter, while continuing the agitation, a total of 0.0005 mole of ammonium persulfate was added over a four hour period of time. The reaction mixture was agitated for a total of five hours at 40–50° C. The polymer was precipitated as finely divided particles by the addition of excess acetone and isolated by suction filtration. The polymer was then washed for ten minutes with acetone in the mixer, isolated by filtration, washed with water and acetone, and dried at 100° C. in a vacuum oven. A yield of 12.3 g. of copolymer, having an inherent viscosity of 0.98 (as measured by a 0.5% solution of the copolymer in chlorobenzene), was obtained. The copolymer contained 8% bromine by analysis which corresponds to an incorporation of 9.3 mole percent of the 2,6-dibromophenylene oxide units in the copolymer. On compression molding at 300° C., the polymer yielded a tough, transparent film. A polymerization of 2,6-dimethyl-4-bromophenol carried out under almost identical conditions yielded a polymer having an inherent viscosity of 0.13 and a brittle compression molded film.

Example XIV

A mixture of 21.5 g. (0.094 mole) of 2-methyl-4-bromo-6-isopropylphenol, 3.4 g. (0.010 mole) of 2,4,6-tribromophenol, 250 ml. of water, 0.111 mole sodium hydroxide added as an approximately 0.5 N aqueous solution, 60 ml. of chlorobenzene, 0.5 g. of the sodium salt of a 1/1 styrene/maleic anhydride copolymer, and 0.1 g. of "Duponol" ME was added to a high shear mechanical mixer and thoroughly mixed. A total of 0.0006 mole of ammonium persulfate was added over a period of six hours. The reaction mixture was agitated at a temperature of 36° C. The polymer was precipitated by the addition of excess acetone and isolated by suction filtration. The remainder of the procedure was the same as that described in Example XIII. A yield of 12.1 g. of copolymer, having an inherent viscosity of 0.52, was obtained.

Example XV

Employing the procedure of Example XIII, the following reaction mixture was agitated for six hours at 37° C.: 16.04 g. (0.080 mole) of 2,6-dimethyl-4-bromophenol, 4.95 g. (0.020 mole) of 2,6-dichloro-4-bromophenol, 250 ml. of water, 0.111 mole of sodium hydroxide added as an approximately 0.5 N aqueous solution, 60 ml. of chlorobenzene, 0.5 g. of the sodium salt of the 1/1 styrene/maleic anhydride copolymer, and 0.1 g. of "Duponol" ME. A total of 0.0006 mole of ammonium persulfate was added during the course of the reaction. The resulting copolymer was isolated, washed, and dried according to the procedure described in Example XIII. A yield of 8.8 g. of copolymer having an inherent viscosity of 1.08 was obtained.

Example XVI

Employing the procedure of Example XIII, the following reaction mixture was agitated for five hours at 50–51° C.: 16.1 g. (0.08 mole) of 2,6-dimethyl-4-bromophenol, 2.0 g. (0.004 mole) of 2,4,6-triiodophenol, 250 ml. of water, 0.091 mole of sodium hydroxide added as an approximately 0.5 N aqueous solution, 50 ml. of chlorobenzene, and 0.1 g. of "Duponol" ME. A total of 0.005 mole of ammonium persulfate was added during the course of the reaction. The resulting copolymer was isolated, washed, and dried according to the procedure described in Example XIII. A yield of 10.1 g. of copolymer having an inherent viscosity of 1.4 was obtained. The copolymer yielded a self-supporting film on compression molding.

*Example XVII*

Employing the procedure of Example XIII, the following reaction mixture was agitated for four hours at 36–56.5° C.: 22.2 g. (0.111 mole) of 2,6-dimethyl-4-bromophenol, 4.1 g. (0.012 mole) of 2,4,6-tribromophenol, 250 ml. of water, 0.13 mole of sodium hydroxide added as an approximately 0.5 N aqueous solution, 40 ml. of benzene, and 0.1 g. of "Duponol" ME. A total of 0.03 ml. of tert-butyl hypochlorite was added during the course of the reaction. The resulting copolymer was isolated, washed, and dried according to the procedure described in Example XIII. A yield of 13.6 g. of copolymer having an inherent viscosity of 0.60 was obtained. The copolymer yielded a self-supporting film on compression molding.

The polyphenylene oxide copolymers prepared according to the process of the present invention are not limited to trihalophenols as comonomers. Copolymers of 2,6-dialkylsubstituted-4-halophenols and pentahalophenols have been prepared in accordance with the process of the present invention and the resultant copolymers have yielded self-supporting compression molded films.

The outstanding physical properties of the high molecular weight homopolymers obtained from 2,6-dimethyl-4-bromophenol made in accordance with the present invention are shown below in Table I. The physical properties were obtained on polymer prepared in accordance with Example I. The polymer was molded at 285° C. into 0.25 in. sheets which were used for the measurements.

TABLE I

| Temp., ° C. | Flex. Mod. in p.s.i. | Tensile Strength in p.s.i. | Ultimate Strength in p.s.i. | Ultimate Elongation in percent | Tensile Impact Strength in ft. lbs./in.$^3$ |
|---|---|---|---|---|---|
| 23 | 412,000 | 10,100 | 9,870 | 11 | 181 |
| 100 | 371,000 | 8,530 | 7,020 | 36 | |
| 150 | 346,000 | 6,220 | 6,220 | | |
| 200 | 280,000 | 3,570 | 2,700 | | |
| 225 | 139,000 | 1,920 | 518 | | 206 |

The polyphenylene ether copolymers made in accordance with the present invention have outstanding fire-resistant characteristics while maintaining equal or better physical properties to those exhibited by the homopolymers. Table II summarizes the burning characteristics of five of the polymers whose preparation is described in the examples. The flammability of these polymers was determined according to A.S.T.M. test D635–56T or, in some cases, to a similar test employing non-standard specimens, said specimens being much thinner. It should be noted that the non-standard specimens would be expected to burn at a more rapid rate and therefore present a more stringent test of the polymer's resistance to burning.

TABLE II

| Copolymer of 2,6-dialkyl-4-bromophenol and— | Preparation Described in— | Result of Flammability Test |
|---|---|---|
| No comonomer | Example I | Burning. |
| 2,4,6-tribromophenol | Example XIII | Non-Burning. |
| 2,4,6-tribromophenol | Example XIV | Non-Burning. |
| 2,6-dichloro-4-bromophenol | Example XV | Self-Extinguishing. |
| 2,4,6-triiodophenol | Example XVI | Non-Burning. |

The effectiveness of the comonomers in imparting fire-resistance to the copolymers varies with the nature of the halogen in the 2- and 6-positions of the comonomer ring. It was found that the order of effectiveness of the halogen in imparting fire resistance to the copolymers was I>Br>Cl. In general, it was discovered that copolymers containing from 0.1 to 3 mole percent of any of the halogenated comonomers were self-extinguishing. Copolymers containing greater than 3 mole percent of the 2,6-dibromophenylene oxide or 2,6-diiodophenylene oxide units are non-burning. At least 15 mole percent of the 2,6-dichlorophenylene oxide units are required to make the copolymers non-burning.

The outstanding physical properties of the high molecular weight copolymers made in accordance with the present invention are shown below in Table III and the summary following. The physical properties were obtained on polymer prepared in accordance with Example XIII. The polymer was molded at 300° C. into 0.25 in. sheets which were used for the measurements.

TABLE III

| Temp., ° C. | Flexural Modulus in p.s.i. | Tensile Strength in p.s.i. | Ultimate Elongation in percent |
|---|---|---|---|
| 23 | 467,000 | 10,600 | 49 |
| 100 | 416,000 | 8,220 | 48 |
| 150 | 387,000 | 5,980 | |
| 200 | 242,000 | 4,200 | |
| 225 | 202,000 | 2,500 | 61 |

Other properties determined were as follows:

Tensile impact strength—76 ft. lbs./inch$^3$
Electrical properties (with 1 kc. frequency):
   (a) Dielectric constant=2.74
   (b) Power factor=0.0004
Heat distortion temperature—200° C./264 p.s.i.
Rockwell Hardness—27 on M scale
Taber abrasion—4 mg. per 1000 cycles
Water absorption—0.2% at 25° C.; 0.4% at 100° C.
Resistance to:
   Hydrolysis—stable in alkali and nonoxidizing acids at room temperature or boiling.
   Thermal degradation—stable at 300° C.
Density—1.127 g./cc.
Creep—12% loss in "apparent modulus" after 100 hours under 2500 p.s.i. stress in flexure at 23° C.

The polymers prepared by the process of the present invention may be modified by the addition of stabilizers, anti-oxidants, fillers, pigments and similar additives known in the art.

The polyphenylene ethers are outstanding in utility, particularly at elevated temperatures, as a dielectric, a packaging material and a corrosion protector. They can be extruded into tough monofilaments, fibers, ribbons, and the like. The polyphenylene ether copolymers offer the advantage of fire resistance with no sacrifice in other physical properties. Since the polyphenylene ethers made by the process of the present invention have molecular weights high enough to give rise to tough, flexible shapes on melt fabrication, they find utility as a general plastic.

I claim:

1. A process for the preparation of fire-resistant polyphenylene ether copolymers which comprises admixing free oxygen and an initiator selected from the group consisting of inorganic peroxyacid salts, organic acid peroxides, hypochlorites, hypobromites, and inorganic periodates with a mixture of monomers consisting essentially of 25–97 mole percent of a phenol having the generic formula

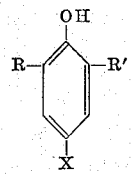

where R and R' are alkyl radicals having 1 to 3 carbon atoms inclusive, and X is a halogen selected from the class consisting of bromine, chlorine, and iodine, and 3 to 75 mole percent of a phenol having the generic formula

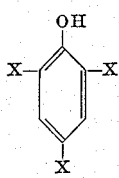

where X is defined as above, an alkali metal hydroxide, the amount present being in excess of that necessary to convert the phenols to phenoxide ions, water, and a liquid inert organic solvent for the copolymer, immiscible with the aqueous phase, agitating the mixture until a high molecular weight copolymer is formed, and recovering the copolymer from the reaction mixture.

2. The process set forth in claim 1 wherein the initiator ammonium persulfate.

3. The process set forth in claim 1 wheerin the initiator is benzoyl peroxide.

4. The process set forth in claim 1 wherein the initiator is tertiary-butyl hypochlorite.

5. The process set forth in claim 1 wherein the organic solvent is benzene.

6. The process set forth in claim 1 wherein the organic solvent is chlorobenzene.

7. The process set forth in claim 1 carried out in the temperature range of 50–60° C. for a period of at least four hours.

8. The process set forth in claim 1 wherein the mixture of monomers consists essentially of 70 to 97 mole percent of the phenol having the generic formula

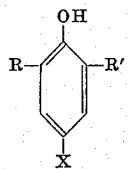

and 3 to 30 mole percent of the phenol having the generic formula

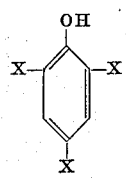

9. A process for the preparation of fire-resistant polyphenylene ether copolymers which comprises admixing free oxygen and an initiator selected from the group consisting of inorganic peroxyacid salts, organic acid peroxides, hypochlorites, hypobromites, and inorganic periodates with a mixture of monomers consisting essentially of 25 to 97 mole percent of a phenol having the generic formula

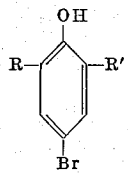

where R and R' are alkyl radicals having 1 to 3 carbon atoms inclusive, 3 to 75 mole percent of a phenol having the generic formula

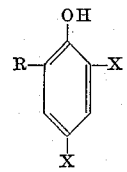

where X is a halogen selected from the class consisting of bromine, chlorine, and iodine, an alkali metal hydroxide, the amount present being in excess of that necessary to convert the phenols to phenoxide ions, water, and a liquid inert organic solvent for the copolymer, immiscible with the aqueous phase, agitating the mixture until a high molecular weight compression moldable copolymer is formed, and recovering the copolymer from the reaction mixture.

10. The process set forth in claim 9 wherein the initiator is ammonium persulfate.

11. The process set forth in claim 9 wherein the initiator is benzoyl peroxide.

12. The process set forth in claim 9 wherein the initiator is tertiary-butyl hypochlorite.

13. The process set forth in claim 9 wherein the organic solvent is benzene.

14. The process set forth in claim 9 wherein the organic solvent is chlorobenzene.

15. The process set forth in claim 9 carried out in the temperature range of 50–60° C. for a period of at least four hours.

16. The process set forth in claim 9 wherein the phenols are 2,6-dimethyl-4-bromophenol and 2,4,6-tribromophenol.

17. The process set forth in claim 9 wherein the phenols are 2,6-dimethyl-4-bromophenol and 2,4,6-triiodophenol.

18. A fire-resistant polyphenylene ether copolymer consisting essentially of from 50 to 97 mole percent 2,6-dialkyl-substituted phenylene oxide units and from 3 to 50 mole percent 2,6-dihalosubstituted phenylene oxide units, wherein the alkyl radicals of the 2,6-dialkylsubstituted phenylene oxide units have 1 to 3 carbon atoms inclusive, and the halo radicals of the 2,6-dihalosubstituted phenylene oxide units are from the class consisting of bromine, iodine, and chlorine, said copolymer having an inherent viscosity of at least 0.3 as measured by a 0.5% solution of the copolymer in chlorobenzene at 25° C. and capable of being compression molded into a self-supporting film.

19. A non-burning polyphenylene ether copolymer consisting essentially of from 85 to 97 mole percent 2,6-dimethylphenylene oxide units and from 3 to 15 mole percent 2,6-dibromophenylene oxide units, said copolymer having an inherent viscosity of at least 0.4 as measured by a 0.5% solution of the copolymer in chlorobenzene and capable of being compression molded into a self-supporting film.

20. A non-burning polyphenylene ether copolymer consisting essentially of from 75 to 85 mole percent 2,6-dimethylphenylene oxide units and from 15 to 25 mole percent 2,6-dichlorophenylene oxide units, said copolymer having an inherent viscosity of at least 0.4 as measured by a 0.5% solution of the copolymer in chlorobenzene and capable of being compression molded into a self-supporting film.

21. The copolymer of claim 18 in funicular form.
22. The copolymer of claim 18 in film form.
23. The copolymer of claim 20 having an inherent viscosity of at least 1.0 measured as described.

References Cited by the Examiner

UNITED STATES PATENTS 3,134,753  5/1964  Kwiatek _____ 260—47

FOREIGN PATENTS 1,259,934  3/1961  France.

OTHER REFERENCES

Hunter, J.A.C.S., vol. 54, pages 2456–2463 (1932).
Staffin et al., J.A.C.S., vol. 82, pages 3632–3634, July 1960.

WILLIAM H. SHORT, *Primary Examiner*.
JOHN C. MARTIN, *Assistant Examiner*.